United States Patent [19]
Kerkman et al.

[11] Patent Number: 5,329,217
[45] Date of Patent: Jul. 12, 1994

[54] COMPENSATED FEEDFORWARD VOLTAGE FOR A PWM AC MOTOR DRIVE

[75] Inventors: Russel J. Kerkman; David Leggate, both of Milwaukee County, Wis.

[73] Assignee: Allen-Bradley Company, Inc., Milwaukee, Wis.

[21] Appl. No.: 999,512

[22] Filed: Dec. 30, 1992

[51] Int. Cl.$^5$ ............................................. H02P 5/40
[52] U.S. Cl. ...................................... 318/811; 363/41
[58] Field of Search ............... 388/811, 819; 318/811, 318/805, 599, 807, 810, 806; 363/41, 98

[56] References Cited

U.S. PATENT DOCUMENTS 4,629,958 12/1986 Kurakake et al. ................... 318/722
5,032,771 7/1991 Kerkman et al. ................... 318/807
5,121,043 6/1992 Kerkman et al. ................... 318/811

Primary Examiner—William M. Shoop, Jr.
Assistant Examiner—John W. Cabeca
Attorney, Agent, or Firm—John J. Horn; H. Frederick Hamann

[57] ABSTRACT

An AC motor drive includes a PWM voltage inverter which is responsive to voltage commands from a synchronous current regulator to control motor armature current and rotor speed. A feedforward voltage is also applied as input to the PWM voltage inverter and it is compensated to boost the effective gain of the inverter when it is operated in the pulse dropping region. The compensation values are precalculated and stored in a table from which they are read during drive operation.

7 Claims, 3 Drawing Sheets

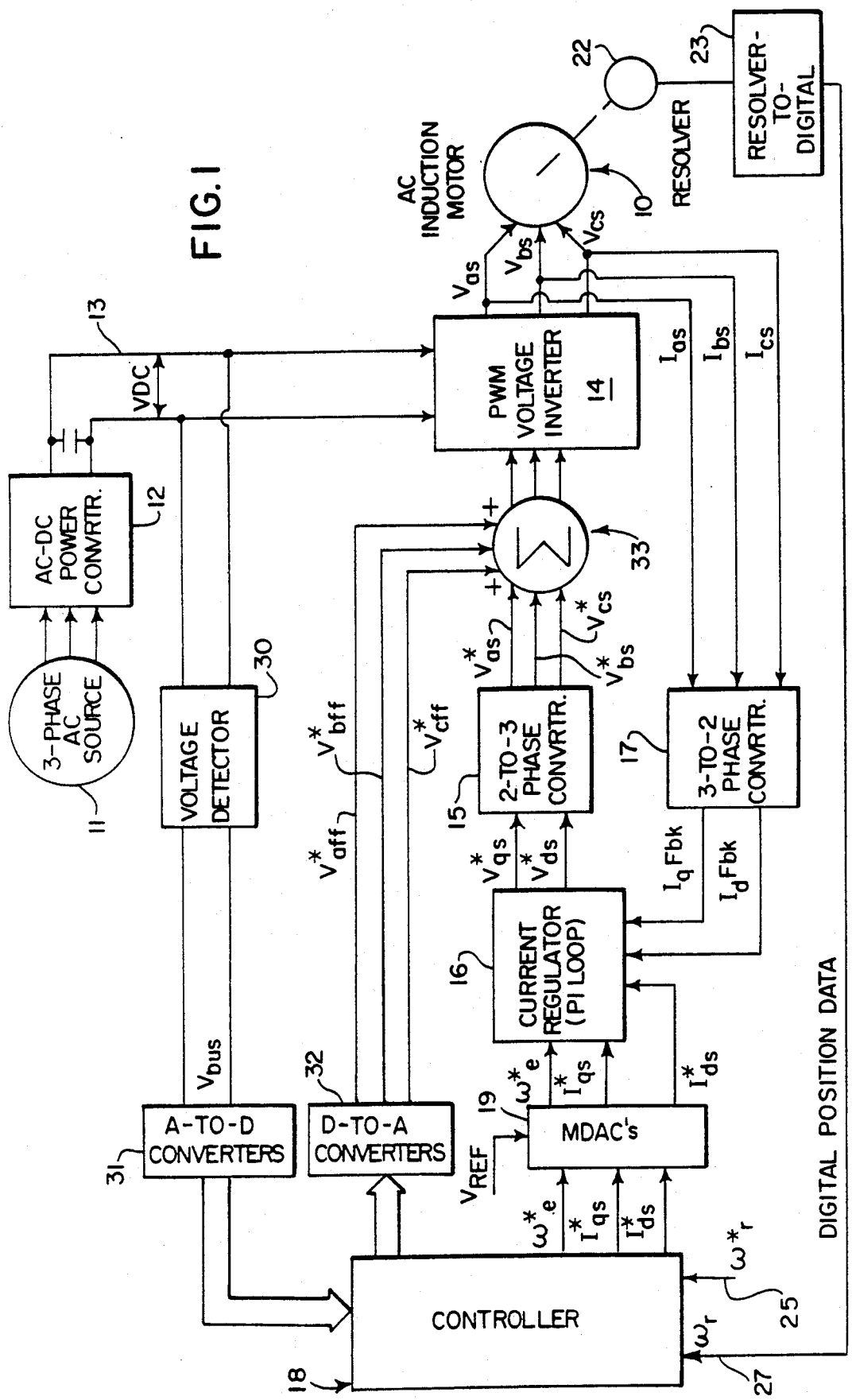

FIG. 2a
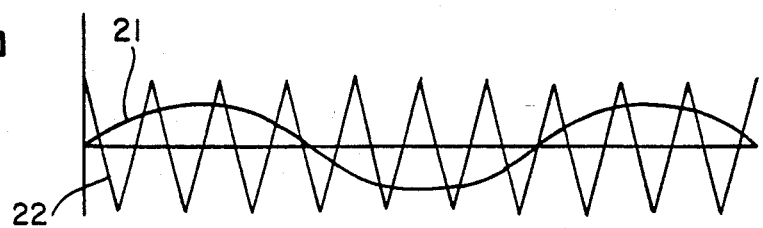
FIG. 2b
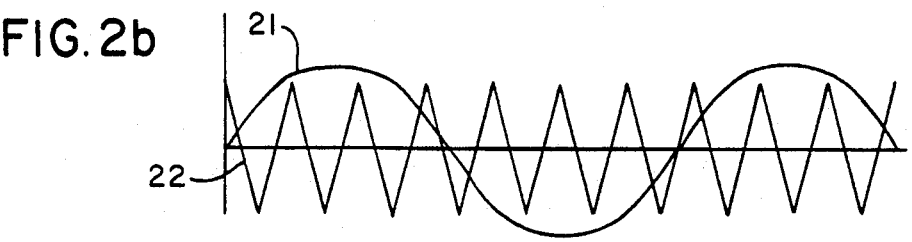
FIG. 2c
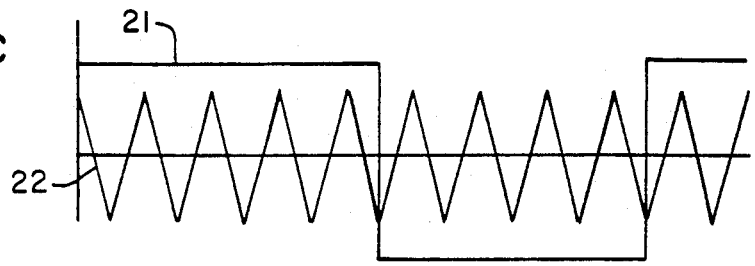
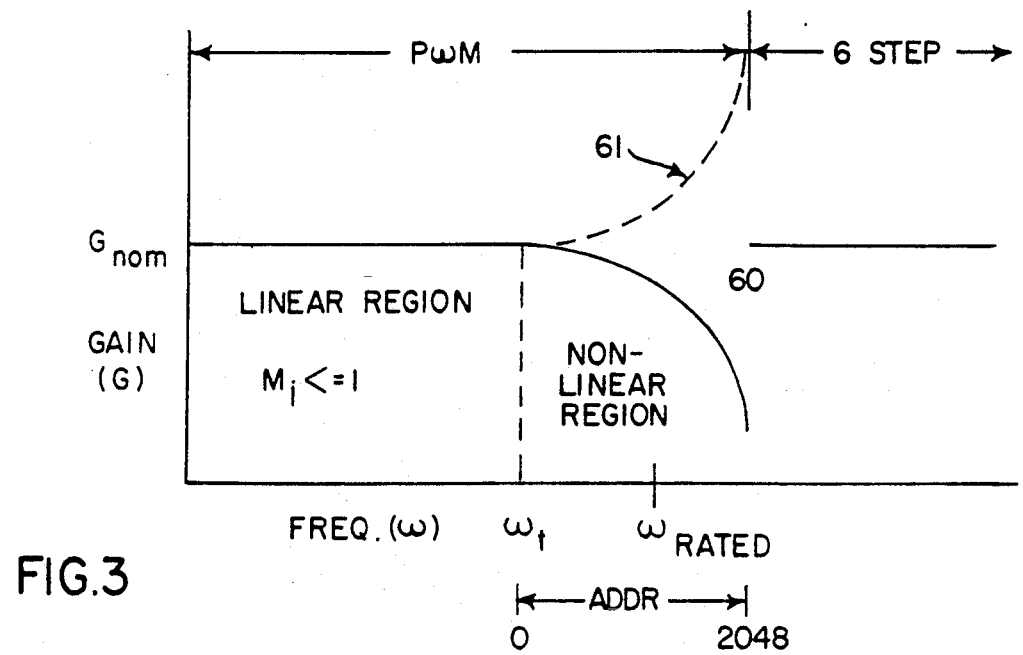
FIG. 3

COMPENSATED FEEDFORWARD VOLTAGE FOR A PWM AC MOTOR DRIVE

BACKGROUND OF THE INVENTION

The field of the invention is AC motor drives for variable speed control of AC induction motors, and more particularly, high performance AC motor drives using pulse width modulation (PWM) techniques.

A motor drive for an AC induction motor includes a power section and a logic and control section. The power section receives power from a 3-phase AC source operating at 60 Hz frequency. The AC power is converted to DC power to provide a PWM inverter with a DC source for synthesizing voltages of different frequencies which are necessary to control the speed of an AC motor.

In high performance drives such as that described in U.S. Pat. No. 5,032,771, vector control, or field-oriented control is employed to control the speed and torque of the AC motor by developing command voltages for the PWM inverter. Such high performance drives employ motor stator current feedback which is resolved into a torque-producing or q-axis component of current, $I_q$, and a flux-producing or d-axis component of current, $I_d$. A motor speed feedback signal is also used for controlling the current components $I_q$ and $I_d$ to thereby control motor torque, speed and slip in accordance with the desired control strategy.

The operation of a closed loop, high performance drive is determined in part by the gain of the loops formed by the feedback from the motor. These closed loops include the PWM inverter, and their gains are, therefore, subject to variations in the gain of the PWM inverter at different motor speeds.

As disclosed in U.S. Pat. No. 5,121,043, the PWM inverter has three distinct regions of operation. At low motor speeds the inverter operates in a linear pulse width modulation mode in which the inverter chops the DC bus voltage into pulses that produce a sinusoidal current in the motor armature that is related to the input voltage command by a constant gain factor and the motor's impedance. Similarly, at high motor speeds the inverter changes to a six step inverter mode in which it produces a current, the fundamental component of which is related to the command voltage by a different gain factor and the motor's impedance. However, in the transition range between these two modes of operation the inverter gain is not constant. This transition range is referred to as the "pulse dropping region" since some of the triangular carrier pulses applied to the PWM inverter are not large enough to produce even a short voltage pulse or are nonexistent at the inverter output.

In this pulse dropping region, the inverter gain drops significantly and adversely affects the closed loop operation of the drive. For example, if a transient load is applied to a motor operating in this pulse dropping region, the drive will not respond properly to the speed or current feedback signal to correct the situation. This problem may be manifested as drops in motor speed or torque or as nuisance trips of the drive protection circuits due to current overload.

SUMMARY OF THE INVENTION

The present invention relates to an AC motor drive, and particularly, to the compensation of a current regulated drive for the loss of PWM inverter gain in the pulse dropping region of operation. More specifically, the AC motor drive includes a PWM inverter which receives voltage commands from a current regulator or from a sine wave PWM voltage algorithm, and a feedforward voltage compensator which includes: means for producing a feedforward voltage that is related in magnitude to the voltage command applied to the PWM inverter, means for determining the point (ADDR) in the pulse dropping region at which the PWM inverter is operating; a compensation table for storing compensation factors that correspond to successive points of operation in the pulse dropping region; means responsive to the operating point (ADDR) for reading the corresponding compensation factor from the compensation table and modifying the feedforward voltage by the indicated amount; and summing the modified feedforward voltage with the voltage command applied to the PWM inverter.

A general object of the invention is to compensate for the drop in gain associated with a sine wave modulated PWM inverter as it operates in the pulse dropping region. In she case of current regulated PWM inverters, the feedforward voltage adds to the voltage command input to the PWM inverter thereby increasing the command above that required to regulate motor stator current. This boost in the modulating signal effectively increases inverter gain and the amount of feedforward voltage precisely offsets the loss in inverter gain normally encountered in the pulse dropping region of operation.

A more specific object of the invention is to maintain control of motor speed and motor torque in the pulse dropping region of operation. The loss in loop gain which normally occurs when operating in the pulse dropping region is precisely offset so that closed loop control of motor speed and torque can be maintained throughout. Thus, the AC motor drive responds promptly and accurately to transient loads which cause it to operate in the pulse dropping region.

The foregoing and other objects and advantages cf the invention will appear from the following description. in the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is an electrical block diagram of an AC motor drive which employs the present invention;

FIGS. 2a-2c are graphic representations of voltages applied to a PWM voltage inverter which forms part of the AC motor drive of FIG. 1 illustrating three distinct modes of operation;

FIG. 3 is a graphic representations of the gain of the PWM voltage inverter in the three modes of operation.

DESCRIPTION OF THE PREFERRED EMBODIMENT

Figures 4, 5:
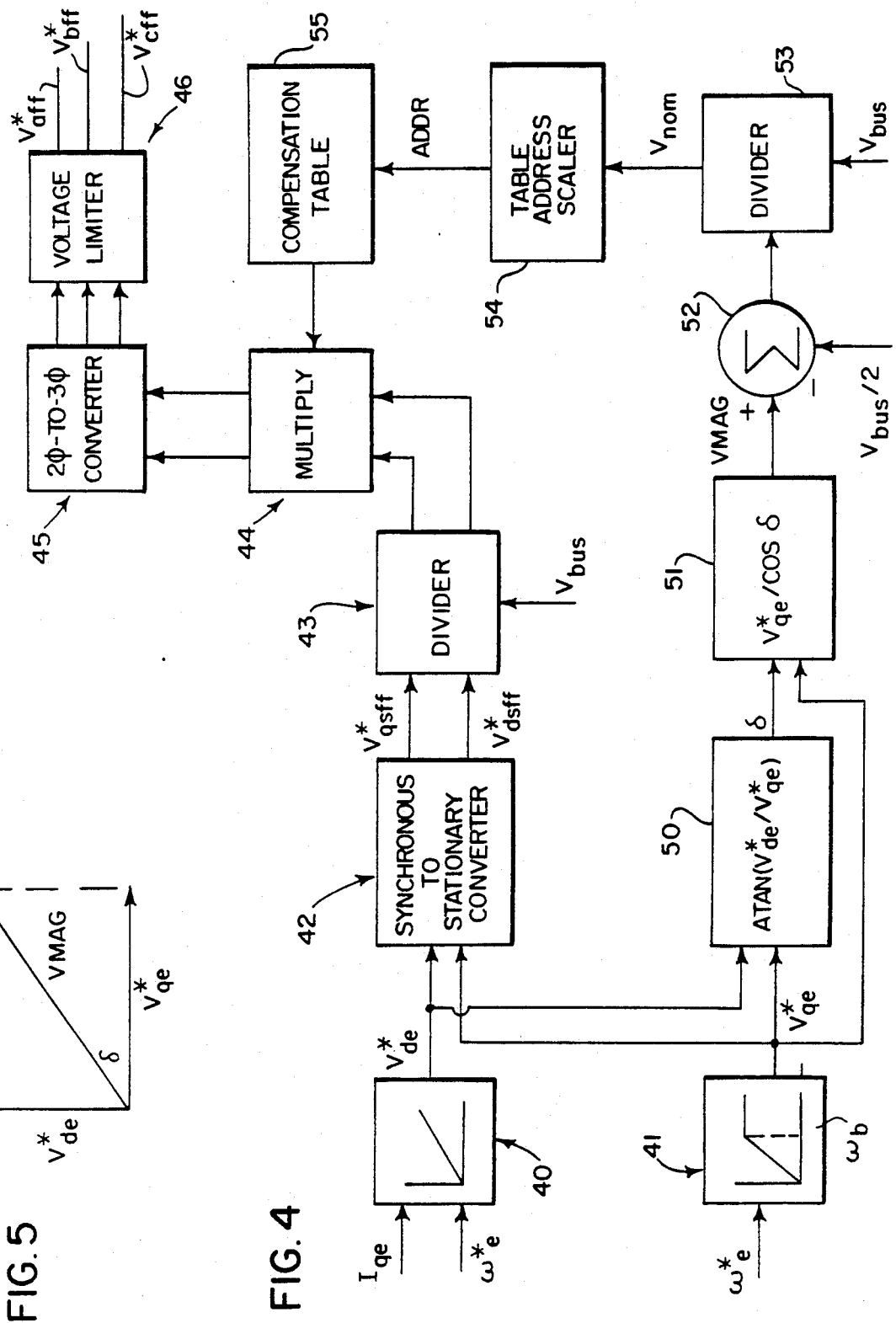
FIG. 4 is an electrical block diagram of the control functions performed by a controller which forms part of the motor drive of FIG. 1.
FIG. 5 shows the relationship between the voltage command VMAG and its quadrature components.

FIG. 1 illustrates a current-regulated pulse width modulation (CRPWM) motor control for an AC induction motor 10. The motor control (also called a "drive") includes a power section that receives power at a line frequency of 60 Hz from a 3-phase AC power source 11. The three phases of the power source are connected to an AC-DC power converter 12 in the power section of the drive. The AC-DC power converter 12 rectifies the alternating current signals from the AC source 11 to produce a DC voltage (VDC) on a DC bus 13 that connects to power inputs on the pulse width modulation (PWM) voltage inverter 14. The AC source 11, the AC-DC power converter 12 and DC bus 13 provide a DC source for generating a DC voltage of constant magnitude. The PWM inverter 14 includes a group of switching elements which are turned on and off to convert this DC voltage to pulses of constant voltage magnitude, but variable width.

The pulse train pattern from a PWM inverter is characterized by a first set of positive-going voltage pulses of constant magnitude but of varying pulse width followed by a second set of negative-going pulses of constant magnitude and of varying pulse width. The RMS value of this pulse train pattern approximates one cycle of a sinusoidal AC waveform. The pattern is repeated to generate additional cycles of the AC waveform and to thereby establish an alternating current of the desired frequency and amplitude in the stator windings of the motor 10.

To control the frequency and magnitude of the AC power applied to the motor 10, the PWM voltage inverter 14 receives three balanced AC inverter command signals, $V^*_{as}$, $V^*_{bs}$ and $V^*_{cs}$ which differ in phase by 120°. The magnitude and the frequency of these voltage commands determines the pulse widths and the number of the pulses in pulse trains $V_{as}$, $V_{bs}$ and $V_{cs}$ which are applied to the terminals of the motor. The asterisk in the first set of signals denotes a "command" signal. The "s" subscript in both sets of signals denotes that these signals are referred to the stationary reference frame. The voltages $V_{as}$, $V_{bs}$ and $V_{cs}$ are phase voltage signals incorporated in the line-to-line voltages observed across the motor stator terminals.

The AC inverter command voltages, $V^*_{as}$, $V^*_{bs}$ and $V^*_{cs}$ result from a 2-phase to 3-phase conversion which is accomplished with a 2-to-3 phase converter 15. The converter input signals $V^*_{qs}$ and $V^*_{ds}$ are sinusoidal AC voltage command signals having a magnitude and a frequency. These signals are related to a stationary d-q reference frame wherein voltages form a balanced two-phase set. The q-axis leads the d-axis by 90° in phase difference.

Phase currents $I_{as}$, $I_{bs}$ and $I_{cs}$ flowing through the motor stator terminals are sensed, using current sensing devices (not shown) of a type known in the art. These signals are fed back to a 2-to-3 phase converter 17 for converting these signals to feedback signals $I_qFbk$ and $I_dFbk$ related to the stationary d-q frame of reference.

The AC voltage control signals $V_{qs}$ and $V_{ds}$ are output signals from a synchronous current regulator 16. The details of this circuit 16 are described in Kerkman et al., U.S. Pat. No. 4,680,695 issued Jul. 14, 1987 and incorporated herein by reference. The synchronous current regulator 16 includes a proportional-integral loop (PI loop) with summing inputs. At one summing input, an AC current command signal for the q-axis, $I^*_{qs}$, is algebraically summed with the $I_qFbk$ current feedback signal to provide a current error for the q-axis. At a second summing input, an AC current command signal for the d-axis, $I^*_{ds}$, is algebraically summed with the $I_dFbk$ current feedback signal to provide a current error for the d-axis. The electrical operating frequency in radians ($\omega^*_e$) is also an input signal to both the q-axis and d-axis branches of the synchronous current regulator circuit. With these input signals, the synchronous current regulator 16 controls the AC voltage command signals $V_{qs}$ and $V_{ds}$ at its outputs in response to current error, and further, it maintains the proper vector orientation of these output signals to the d-axis and the q-axis.

The commands input to the current regulator 16 are produced by a controller 18. The controller 18 is embodied in a microcomputer operating in response to a stored program. In the preferred embodiment a model 8096 microcomputer manufactured by Intel Corporation is used, and the various digital signals which are shown input to, or output from the controller 18 are coupled to the microcomputer's 8-bit data bus.

The basic functions of the controller 18 are to respond to a speed feedback signal $\omega_r$ to provide two AC current commands $I^*_{qs}$ and $I^*_{ds}$ and the stator operating frequency command $\omega^*_e$ to the current regulator 16. The controller 18 receives speed feedback $\omega_r$ from the rotor in the form of digitized position data from a resolver 22 coupled to the rotor of the motor 10. As the rotor rotates, signals are generated from the resolver 22 to a resolver-to-digital conversion circuit 23 which transmits the digital position data to the controller 18. The controller 18 also receives a speed command $\omega^*_r$ at a user input 25.

The controller 18 generates digital values for $I^*_{qs}$ and $I^*_{ds}$ which are instantaneous values of AC signals in the form of $I^* \cos\theta_e$ and $-I^* \sin\theta_e$, respectively. The series of digital values follows the functions $I^* \cos(\omega_e t + \theta_{eo})$ and $-I^* \sin(\omega_e t + \theta_{eo})$. These values are inputs to MDAC circuits 19, where the values are multiplied by $V_{REF}$ to arrive at the proper analog signal levels for input to the synchronous current regulator 16. A commercial version of this circuit is the AD 7524 multiplying digital-to-analog converter offered by Analog Devices, Norwood, Mass. The signals resulting from the conversion through MDAC circuits 19 are designated $I^*_{qs}$ and $I^*_{ds}$ and are AC input signals to the synchronous current regulator 16.

The drive system thus far described is known in the art and is described in the above-cited patents. It is responsive to a speed input command $\omega^*_r$ to the controller 18 to apply voltage commands $V^*_{as}$, $V^*_{bs}$, $V^*_{cs}$ to the PWM voltage inverter 14 that cause the induction motor 10 to rotate at the desired speed and torque. Rotor position feedback $\omega_r$ from the resolver 22 and armature current feedback $I_{as}$, $I_{bs}$ and $I_{cs}$ enables the drive system to respond to changing load conditions to maintain the desired motor speed and torque. The proper operation of this closed loop system depends on knowledge of the open loop gain of the various elements in the system—including the gain of the PWM voltage inverter 14. As will now be explained, the inverter gain is far from constant over the speed range of the drive system, and this makes it difficult to properly damp the control loops.

The PWM voltage inverter 14 is a natural sampling PWM inverter which switches a set of six solid state switches (i.e., BJT's or IGbt's) between the DC bus 13 and the three stator windings on the motor 10. This switching takes place when the sinusoidal input command voltages $V^*_{as}$, $V^*_{bs}$ or $V^*_{cs}$ exceed a triangular shaped reference voltage, or "carrier". As long as the peak of the command voltage is less than the peak voltage of the triangular reference carrier, the full sine-triangle modulation occurs as shown in FIG. 2a. That is the voltage command sine wave 21 intersects each of the pulses of the triangle carrier wave 22 and the inverter produces a corresponding voltage pulse for the motor 10. As seen in FIG. 3, the inverter gain (G) remains relatively constant at $G_{nom}$ as speed and frequency of the motor are increased in this "linear" mode of inverter operation.

At some frequency ($\omega_t$) typically below a rated frequency ($\omega_{RATED}$) which corresponds to base speed for the motor, a nonlinear or pulse-dropping region is encountered. This is the transition region illustrated in FIG. 2b, where some of the pulses of the triangular carrier wave 22 are not intersected by the voltage command 21. This results in an inverter output pulse being dropped or missed and is referred to in the art as the "pulse dropping" region. This results in a lower RMS voltage being applied to the motor from the outputs of the PWM inverter 14. As seen in FIG. 3, the result is that inverter gain (G) drops off substantially in this region, and the RMS output voltage to the motor 10 is less than commanded, unless something is done to offset, or respond to the loss of gain.

FIG. 2c illustrates the region beyond the transition region where virtually no sine-triangle modulation occurs and the drive is operated in a conventional six-step square wave output mode. This mode is employed at the upper end of the motor speed range, in the constant horsepower range of operation. PWM operation is employed over the speed range where the fundamental output voltage is less than the fundamental for six-step operation, to reduce harmonic content and inhibit torque pulsations at the lower speeds, and it is the transition between these two modes which present the problem.

To address the problems created by the gain characteristics of the PWM voltage inverter 14, the controller 18 receives a DC bus voltage feedback signal $V_{bus}$ through a voltage detector 30 and an analog-to-digital converter 31. As part of its control functions, the controller 18 produces three voltage feedforward signals $V^*_{aff}$, $V^*_{bff}$ and $V^*_{cff}$ which are output through digital-to-analog converters 32, and summed at summing circuits 33 with the respective voltage commands signals $V^*_{as}$, $V^*_{bs}$ and $V^*_{cs}$ from the converter 15. In the case of an inverter employing sine wave modulating voltage, $V^*_{aff}$, $V^*_{bff}$ and $V^*_{cff}$ form the complete modulating signal. As will be described below, these feedforward voltages compensate for the non-linear inverter gain and thereby maintain the gain of the entire drive relatively constant. As a result, speed and torque can be accurately controlled in response to transient load conditions.

The additional hardware required to implement the present invention is minimal. The voltage detector 30 provides a logic level analog signal which is isolated from the high bus voltage $V_{DC}$ and which is filtered to remove noise signals common to the industrial environment. The A-to-D converter 31 and D-to-A converter 32 may be separate commercially available integrated circuits, or they may be an integral part of the microcomputer. The summing circuits 33 are conventional voltage summing circuits formed around commercially available operational amplifiers.

To practice the present invention, signals generated by the controller 18 as part of its closed loop control of the drive system are employed along with the bus voltage feedback signal $V_{bus}$. In addition to producing command signals $\omega^*_e$, $I^*_{qs}$ and $I^*_{ds}$ for the current regulator 16, the controller 18 also produces voltage feedforward signals $V^*_{aff}$, $V^*_{bff}$ and $V^*_{cff}$ in accordance with the teachings of the present invention to be described in detail below. In the current embodiment of the invention these controller functions are performed under the direction of a control program executed by the 8096 microcomputer at 500 microsecond time intervals. This program and the slip control loop and flux control loop which it drives are described in more detail in U.S. Pat. No. 5,032,771 issued on Jul. 16, 1991 and entitled "Slip Control Based On Sensing Voltage Fed To An Induction Motor". The disclosure in this patent is incorporated herein by reference. The present invention, as well as the other controller functions, may also be embodied in discrete digital logic circuitry, or preferably, in an application specific integrated circuit ("ASIC"). Accordingly, the preferred embodiment will be described with reference to the function block diagram of FIG. 4, but it will be appreciated by those skilled in the art that these functions may be carried out by a programmed microcomputer, discrete digital logic or an ASIC.

Referring particularly to FIG. 4, the d-axis voltage command $V^*_{de}$ is produced as part of the slip control loop by a function block 40. The quadrature current command $I^*_{qe}$ and the speed command $\omega^*_e$ are input to the function block 40 which calculates the voltage $V^*_{de}$ according to the following approximation.

$$V^*_{de} = r_s I^*_{de} - \omega^*_e \sigma I^*_{qe}$$

where $\sigma$ is a lumped constant $$\sigma = \frac{L_s L_r - L_m^2}{L_r}$$

where $L_s$ is the inductance of the stator,
where $L_m$ is the magnetizing inductance, and
where $L_r$ is the inductance of the rotor.

A q-axis voltage command $V^*_{qe}$ is also produced by a function block 41 which is part of the flux control loop. The voltage command $V^*_{qe}$ is produced as a function of the speed command $\omega^*_e$ according to the following approximations:

$$V^*_{qe} = r_s I^*_{qe} + \omega^*_e \lambda_{de}$$

$$V^*_{qe} \approx (\omega^*_e)(\lambda_{de})$$

where $R_s$ is the resistance of the stator, and
where $\lambda_{de}$ is the d-axis flux.

Above base speed ($\omega_b$), the q-axis voltage command $V^*_{qe}$ is maintained constant.

The two motor command voltages $V^*_{de}$ and $V^*_{qe}$ are used develop feedforward voltages that will compensate the drive for loss of inverter gain. These voltages are converted voltage commands $V^*_{qsff}$ and $V^*_{dsff}$ in the stationary d-q reference frame by performing the transformation represented by function block 42. This transformation is well know in the art and is described in Bose, "Adjustable Speed AC Drive Systems", *IEEE Press*, 1980, p. 14. In the case of a sine wave PWM voltage algorithm, $V^*_{qsff}$ and $V^*_{dsff}$ become the complete modulation voltage. The two feedforward voltages $V^*_{qsff}$ and $V^*_{dsff}$ are then normalized by dividing them by the bus voltage feedback signal $V_{bus}$ in divider block 43. This normalization compensates the feedforward voltages for dips in DC bus voltage. The normalized feedforward voltages are further compensated in a multiplier 44 for the loss of inverter gain as will be described in detail below, and the fully compensated quadrature feedforward voltages are applied to a two-phase-to-three-phase converter 45. The converter 45 is similar to the converter 15 described above and well known in the art, and it produces the three fully compensated feedforward voltages $V^*_{aff}$, $V^*_{bff}$ and $V^*_{cff}$ which are summed as described above with the motor armature voltage commands $V^*_{as}$, $V^*_{bs}$ and $V^*_{cs}$ (FIG. 1). A voltage limiter function block 46 insures that these compensated feedforward voltages remain within the range of the digital-to-analog converters 32.

The remainder of the system in FIG. 4 functions to compensate the feedforward voltages for loss of inverter gain. This is accomplished by determining where the motor is being operated in its operating range and producing a corresponding compensation factor (COMP) which is applied to the multiplier 44 described above. If no compensation is required, as when operating in the linear region (FIG. 3) this compensation factor is "one". On the other hand, when the motor is operated in the non-linear region where pulse dropping occurs, the compensation factor increases to precisely offset the loss of inverter gain.

Referring to FIGS. 4 and 5, to determine where the motor is operating the voltage command (VMAG) applied to the inverter is calculated from its quadrature components $V^*_{de}$ and $V^*_{qe}$. To avoid a square root calculation, this is accomplished in a two step process indicated by function blocks 50 and 51. The first block 50 calculates the arctangent of the quadrature voltage command ratio $V^*_{de}/V^*_{qe}$ to determine the angle $\delta$ of VMAG. The second block 51 then calculates the magnitude of VMAG as the ratio $V^*_{de}/\cos\delta$.

Referring particularly to FIGS. 3 and 4, the next step is to determine from VMAG where the motor is operating. The non-linear region begins when VMAG is one half the bus voltage ($V_{bus}/2$) and it ends when VMAG is twice the bus voltage divided by $\pi$ ($2V_{bus}/\pi$). These values are measured constants for the PWM voltage inverter 14, and they determine the boundaries of the gain compensation region. In other words, if VMAG lies within this voltage range, a compensation factor greater than 1 is applied to the multiplier 44. Accordingly, the value of the lower boundary $V_{bus}/2$ is subtracted from VMAG by a summing block 52 and the result is normalized by dividing by the bus voltage $V_{bus}$ to produce an index $V_{nom}$ at divider 53. This index $V_{nom}$ is then converted to a memory address in a table address scaler block 54 which performs the following calculation:

$$ADDR = V_{nom}((2048)/(4-\pi)/2\pi).$$

The value "2048" in this formula is the address space occupied by a compensation table 55 that stores the compensation factors applied to multiplier 44. This formula scales the $V_{nom}$ value over the operating range $2V_{bus}\pi - V_{bus}/2$ in which gain compensation is required. This is shown best in FIG. 3 where the table addresses ADDR are distributed evenly over the non-linear operating region of the inverter 14.

The values stored in the compensation table 55 are determined from a model of the inverter gain which is shown graphically in FIG. 3 as graph 60. The compensation factors stored at the successive 2048 locations in the compensation table 55 lie on the graph indicated by dashed line 61. At any operating point within the non-linear operating region, the compensation factor is: COMP = 1/inverter gain G. When operating in this region, therefore, the compensation factor which will precisely offset the loss in inverter gain is read from the compensation table 55 by the value ADDR and is applied to the multiplier 44 to boost the feedforward voltages by the proper amount.

The drop in inverter gain G during the pulse dropping mode of operation is described for a naturally sampled PWM inverter by T. M. Rowen, R. J. Kerkman and T. A. Lipo in "Operation Of Naturally Sampled Current Regulators On The Transition Mode", *IEEE Transactions on Industry Applications*, vol. 1A-23, No. 4, July/August 1987. The inverter gain G is modeled by the following equation:

$$G = V/V_{com} =$$

$$V_{bus}/(\pi A_t)[\sin^{-1}(1/M_i) + (1/M_i)\sqrt{1-(1/M_i)^2}\,].$$

where:

$A_t$ = peak of triangle wave carrier voltage;
$M_i$ = modulation index defined as the ratio of peak modulating voltage to the peak of the triangle wave carrier voltage;
$V_{bus}$ = DC bus voltage;
$V$ = desired motor terminal voltage;
$V_{com}$ = modulating sine wave voltage command.

The gain function may be rearranged into the following form:

$$\frac{V}{V_{bus}} = \frac{1}{\pi}\left\{\sin^{-1}\left(\frac{1}{M_i}\right) + \left(\frac{1}{M_i}\right)\sqrt{1-\left(\frac{1}{M_i}\right)^2}\,\right\}M_i$$

by dividing each side by $V_{bus}$, multiplying each side by $V_{com}$ and by recognizing that $V_{com}/A_t = M_i$. In this new equation a normalized terminal voltage is expressed solely as a function of $M_i$. A table of inverse relationships between $V/V_{bus}$ and $M_i$ can therefore be calculated off-line which can be used to linearize the inverter in accordance with the exact inverter gain equation (which is valid for $M_i >> 1$). A normalized incremental voltage, corresponding to the amount by which V exceeds $V_{bus}/2$:

$$\Delta V_i = \Delta V_{com}\left(\frac{1}{V_{bus}}\right) = n\left(\frac{V_{com}}{V_{bus}} - \frac{1}{2}\right)$$

may be used as a convenient look up index representative of the inverter operating point where n equals the number of table entries. When scaled to the interval 0 to $(4\pi)/2\pi$ the normalized incremental voltage provides the addresses of the compensation factors stored in memory as table 55 for use by the multiple 44. Since the table entries can be calculated off-line, a single-dimensional look-up table of resonable size (for instance, 2048 values) can therefore be used to provide accurate inverter gain loss compensation in the pulse dropping region.

TABLE A

| Table Address | Compensation Factor |
|---|---|
| 1 | 1.0009 |
| 2 | 1.0009 |
| 3 | 1.0009 |
| . | . |
| . | . |
| 500 | 1.0342 |
| 501 | 1.0342 |
| 502 | 1.0342 |
| . | . |
| . | . |
| 1000 | 1.1445 |
| 1001 | 1.1450 |
| 1002 | 1.1450 |
| . | . |
| . | . |
| 1500 | 1.4492 |
| 1501 | 1.4501 |
| 1520 | 1.4516 |
| . | . |
| . | . |
| 2000 | 4.2373 |
| 2001 | 4.2749 |
| 2002 | 4.3144 |
| 2003 | 4.3544 |
| . | . |
| . | . |
| 2046 | 10.1718 |
| 2047 | 10.7519 |
| 2048 | 11.4453 |

The feedforward voltages $V^*_{aff}$, $V^*_{bff}$ and $B^*_{cff}$ developed in accordance with the present invention effectively alter the gain of the RWM inverter 14 by boosting, or compensating, the input command voltages to the inverter 14 at the proper times. This occurs in the event the DC bus voltage drops and it occurs when the inverter is operated in the pulse dropping region. As a result, the effective inverter gain remains relatively constant under all operating conditions and the control loops of the motor drive can be accurately damped for the desired response to changing load conditions.

It should be apparent that a number of variations are possible from the preferred embodiment described above. For example, the number of entries in the compensation table 55 may be altered to provide any desired resolution in the compensation curve 61. Also, while the best performance was achieved using the synchronous current regulator described above, significant improvements in the operation of other PWM AC motor drives may also be achieved.

We claim:

1. In an AC motor drive having a PWM inverter which controls motor armature current in response to a sine wave voltage command and is operationally characterized by an operating point and an effective gain, the improvement comprising:

means for producing a feedforward voltage which is proportional to the voltage command applied to the PWM inverter;

means for determining the operating point of the PWM inverter when it is operating within a pulse dropping region in which the PWM inverter gain drops below its nominal gain;

means for producing a compensation factor value which comprises an addressable compensation factor table including a plurality of compensation factor values which have been generated off-line as functions of different modulation index values and means for reading a compensation factor entry value therefrom by reading out a value from an address location determined as a function of the PWM inverter operating point; and a multiplier for magnifying the value of the feedforward voltage by the compensation factor providing a compensated sinusoidal voltage command to the PWM inverter that substantially maintains the effective gain of the PWM inverter at its nominal value throughout its pulse dropping region of operation.

2. The improvement as recited in claim 1 in which a summing means combines the magnified feedforward voltage with the sine wave voltage command to produce the compensated sinusoidal voltage command to the PWM inverter.

3. The improvement as recited in claim 1 which includes a current regulator for producing the sine wave voltage command and the feedforward voltage is produced from a command used to determine a current command applied to the current regulator.

4. The improvment as recited to claim 3 in which the current regulator is a synchronous proportional plus integral current regulator.

5. The improvement as recited in claim 1 in which a power converter applies a DC voltage to the PWM inverter and the feedforward voltage is divided by a feedback signal proportional to the DC voltage.

6. The improvment as recited in claim 1, wherein said compensation factor values have been generated off-line in accordance with the equation:

$$\frac{V}{V_{bus}} = \frac{1}{\pi}\left\{ \sin^{-1}\left(\frac{1}{M_i}\right) + \left(\frac{1}{M_i}\right)\sqrt{1 - \left(\frac{1}{M_i}\right)^2} \right\} M_i$$

7. The improvement as recited in claim 1, wherein said PWM inverter operating point is represented by a normalized incremental voltage which is used in generating the address for accessing the desired compensation factor value.

* * * * *